May 7, 1963  F. LYMAN, JR  3,088,992
HOLDER FOR ELECTRICAL COMPONENTS, SUCH AS BATTERIES
Filed Nov. 1, 1960

INVENTOR.
Frank Lyman, Jr.
BY
Roberts, Cushman & Grover
ATT'YS.

3,088,992
HOLDER FOR ELECTRICAL COMPONENTS,
SUCH AS BATTERIES
Frank Lyman, Jr., Cambridge, Mass., assignor to Cambridge Thermionic Corporation, Cambridge, Mass., a corporation of Massachusetts
Filed Nov. 1, 1960, Ser. No. 66,526
9 Claims. (Cl. 136—173)

The field of this invention is that of electrical circuit component holders, more particularly of holders for electrical batteries or cells.

Objects of this invention are to provide a battery holder which is especially adapted for use on boards or panels, especially also in conjunction with printed circuits; to provide such a holder which will attach a battery in very firm mechanical and electrically conductive, relation to contact means under conditions of severe shock or vibration; to provide such a holder in which a battery can be conveniently secured and from which a battery can be conveniently removed by means of a simple conventional tool; and to provide such a battery holder which is compact and rugged, which is of light weight, and which is inexpensive in manufacture and assembly.

The substance of the invention can be briefly summarized as to characteristic aspects thereof as follows.

Battery holders according to the invention comprise a resilient open frame adapted to receive a battery therein and a clamp member adapted to fit over ends of the frame for drawing them inwardly gripping the battery therebetween. In a preferred practical embodiment, the frame is U-shaped, lugs are disposed thereon adjacent the frame ends, and a clamp member preferably arcuate to conform to the shape of a cylindrical battery, is engaged beneath these lugs for holding the battery itself as well as for urging the frame ends inwardly against the ends of the battery. At least one leg of the battery holder frame and if desired both legs of the frame, carry battery contact means which are insulated from the frame and which are arranged to contact the battery as the frame legs are drawn inwardly by the clamp member to be held in series relation with the battery.

In another aspect of the invention, the clamp member has two spaced apertures, adapted to be engaged with respective frame legs, the edges of these apertures being capable of being inserted underneath the above mentioned lugs. In this construction, the clamp member can first be fitted over one frame leg under lugs laterally extending therefrom, whereupon it can be rotated to be engaged under, out and downwardly extending tabs or lugs on the other leg, while axially drawing and holding the frame legs inwardly to grip a battery therebetween.

In a further important aspect of this invention, one frame leg is provided with a recess adjacent the lugs and adapted to receive lever tool means which can be inserted through a clamp member aperture and into the frame leg recess, and used for wedging the clamp member downwardly to be engaged beneath the frame lugs. A clamp member aperture is preferably notched to receive a lever tool means, whereby, when such a tool is inserted within this notch, the adjacent frame leg can be levered inwardly of the frame to release engagement by the lug of the clamp member.

These and other objects and aspects of the invention will appear from the following description of preferred embodiments thereof illustrating its novel characteristics.

The description refers to a drawing in which.

Figure 1:
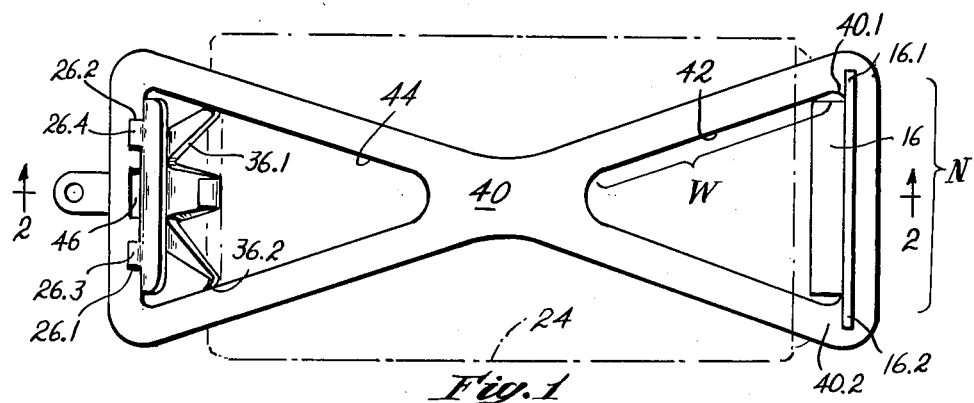
FIG. 1 is a plan view of a battery holder according to the invention with a battery secured therein.

In FIGS. 1 to 4, numeral 10 indicates a battery holder frame of resilient material including a base portion 12 and upright legs 14 and 16 at opposite ends of the base portion. The frame has mounting holes 18 to receive screws or other fastening means 20 for attaching the battery holders to a support such as the mounting board 22 of a printed circuit. A battery (indicated in dotted lines) 24 fits within the frame between the frame legs.

Figure 2:
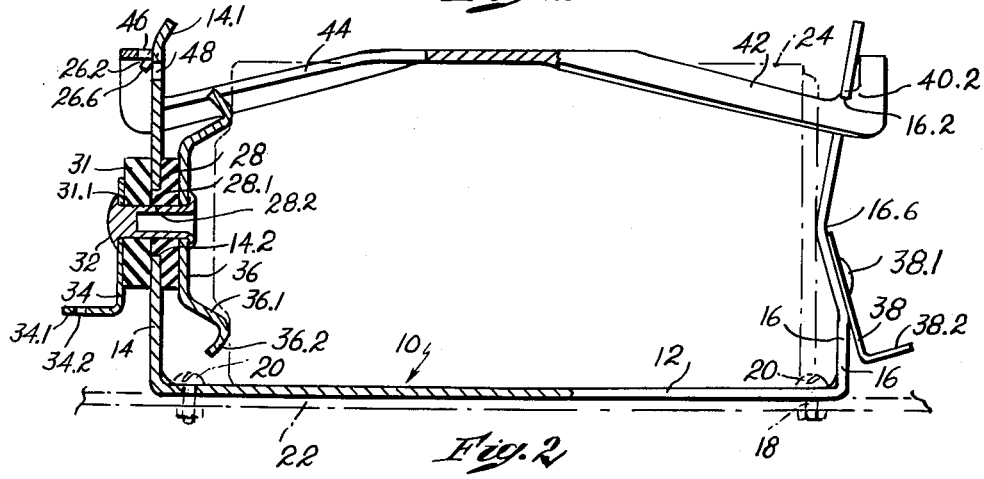
FIG. 2 is a sectional view along line 2—2 of FIG. 1.
Figure 3:
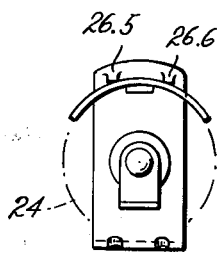
FIG. 3 is an end elevation, to reduced scale, viewed from the left of FIG. 1.
Figure 4:
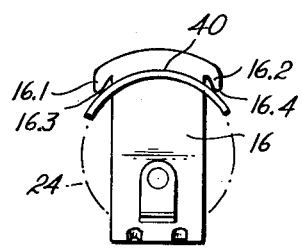
FIG. 4 is an end elevation, to reduced scale, viewed from the right of FIG. 1.

A pair of tabs or lugs 26.1, 26.2 are struck out from the outer face of the frame leg 14 and the upper end 14.1 of the frame leg 14 is bent inwardly of the frame while the tabs 26.1, 26.2 point outwardly and downwardly to provide the wedge surfaces 26.3, 26.4 and the downwardly facing shoulders 26.5, 26.6 for a purpose to be explained below. The frame leg 14 is apertured as at 14.2, and a disc 28 with a bushing portion 28.1 an axial hole 28.2, is fitted against the inner surface of the frame leg with the bushing portion of the disc inserted in the frame leg aperture. A corresponding disc 31 having the central bore 31.1 is fitted against the outer surface of the frame leg with the disc bore aligned with the frame leg aperture 28.2. The discs 28 and 31 are preferably made of rubber but can be made of any suitable, preferably stiffly resilient, insulating material. A semi-tubular rivet 32 secures a battery terminal 34 to the insulating disk 38 and securely holds a generally cup-shaped spring 36 against the insulating disc 28, the discs 28 and 31 serving to insulate the terminal means and spring from contact with the frame. The terminal 34 preferably has a horizontally extending portion 34.1, bored as at 34.2, for convenient electrical connection. The spring means 36 is preferably star-shaped with arms 36.1 having rounded ends 36.2, as shown in FIGS. 1 and 2. It will however be understood that any suitable means adapted to be resiliently held in electrically conductive relation with the battery 24 is within the scope of this invention.

The frame leg 16 has laterally extending ear portions 16.1, 16.2 providing downwardly facing shoulders 16.3, 16.4 (FIG. 4) at each side of the frame leg, and preferably the leg is bent inwardly as at 16.6 for convenient engagement of the leg in electrically conductive relation to the battery 24. In one embodiment, the frame leg 16 has a terminal 38 secured thereto by a rivet 38.1, the terminal having a suitably apertured horizontal portion 38.2 for facilitating electrical connection of the battery holder in a printed circuit, similar to the comparison terminal 34.

A clamp member 40 preferably of arcuate shape corresponding to the shape of a cylindrical battery disposed within the holder (as shown particularly in FIGS. 3 and 4) has two spaced apertures 42 and 44. The aperture 42 has a wide arm portion indicated at W, which is adapted to pass over the extensions or ears 16.1, 16.2 of the frame leg 16. This aperture 42 also has a narrow side marked N, the corner portions 40.1, 40.2 of which can be engaged beneath the ears 16.1, 19.2. The aperture 44 is so proportioned, and spaced from the aperture 42 that, while the clamp side N is engaged beneath the frame leg shoulders 16.1, 16.2, the other aperture 42 can be easily fitted over the upper end of the frame leg 14, clearing the inturned lip 14.1 of the frame leg and slidingly engaging the inclined surfaces 26.5, 26.6 of the frame leg tabs 26.3 and 26.4. The clamp member aperture 44 is centrally notched at 46 and the frame leg 14 is correspondingly apertured as at 48 for a purpose to be described below.

The holder according to the invention is used as follows.

Figure 5:
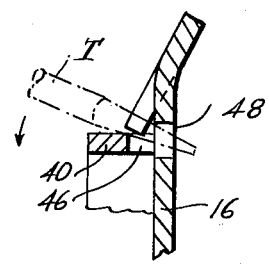
FIG. 5 is a partial sectional view similar to FIG. 2, showing the use of a tool in securing a battery within the holder.

The battery 24 is axially disposed between the frame legs 14 and 16. Then the wide leg portion W of the clamp member aperture 42 is fitted over the ears 16.1, 16.2 of the frame leg 16 whereupon the clamp is rotated until the edges 40.1, 40.2 of the narrower portion N of the clamp member aperture 42 is engaged by the downwardly facing shoulders 16.3, 16.4 of the frame leg. Thereupon the transverse side of the clamp member aperture 44 can be fitted over the frame leg 14 and, as shown in FIG. 5, a lever tool T, such as a screw driver, inserted through the clamp member notch 46 into the frame leg notch 48, whereby downward pressure on the lever tool, as indicated by the arrow in FIG. 5, wedges the clamping member over the frame leg tabs 26.1, 26.2 to engage the clamp member beneath the downwardly facing shoulders 26.5, 26.5 of the tabs. In wedging the clamp member over the tabs the frame legs 14 and 16 will be drawn inwardly thereby securely gripping the battery 24 between the frame leg 16 and the spring 36 on leg 14, and electrically connecting the frame, battery and terminal 34 in series relation.

Figures 6, 7:
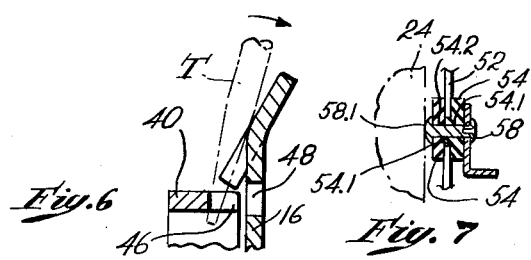
FIG. 6 is a partial sectional view similar to FIG. 2, showing the use of a tool in removing a battery from the holder.
FIG. 7 is a partial sectional view similar to FIG. 2 but to reduced scale, showing an alternative embodiment of the invention.

For removing the battery from the holder, the lever tool T is inserted in the notch 46 of the clamp member, as shown in FIG. 6, and the tool moved in the direction indicated by the arrow in FIG. 6. This will move the frame leg 14 inwardly to sever engagement of the frame tabs 26.1, 26.2 with the clamp 40. The clamp can then be raised and rotated to bring the wide dimension W of the aperture 42 over the extending ear portions 16.1, 16.2 of the frame leg 16. The clamp 40 and the battery 24 can then be removed from the frame.

An alternative embodiment of the battery holder according to the invention is illustrated in FIG. 7. As shown in that figure, the holder, which is otherwise similar to the embodiment illustrated in FIGS. 1 to 4, has an upright leg 52 corresponding to the leg 16 previously described. This frame leg 52 is apertured as at 52.1 and an insulating disc 54, having a bushing portion 54.1 and a central bore 54.2, is fitted against the inner surface of the frame leg with the bushing portion of the disc inserted in the frame leg aperture. A second insulating disc 54 having a central bore 54.1 is fitted against the outer surface of the frame leg in alignment with the frame leg aperture. A semi-tubular rivet 58 secures a terminal 60 to the insulating disc 56 and insulates the terminal from the frame. The head 58.1 of the rivet 58 makes excellent contact with a battery within the holder. In this construction individually insulated terminal means for the battery are thus provided at either end of the battery holder frame.

It will now be evident that battery holders according to this invention offer the following advantages and improved results among others similarly appearing from the above exposition of the substance of the invention and description of practical embodiments.

The new battery holder is formed of simply machined and light-weight parts which are inexpensively assembled to provide a particularly compact, rugged and rigid battery holder, which results can to this degree not be attained with purely manual battery insertion without tool. The use of a tool is not objectionable in this instance, since the battery can be conveniently inserted or removed from the holder by using a simple and readily available tool means such as a screwdriver or metal strip. This mode of insertion however permits the incorporation of stiffly resilient holder components for securely gripping the battery, thereby to assure permanently secure and efficient connection of batteries, especially in printed circuits, even though the battery is exposed to conditions of extreme shock and vibration.

It will also be evident that, although the battery is secured against movement in any direction, only a single easily detached member must be removed from the holder to provide convenient access to a battery disposed therein, purely manual extraction of the battery being then possible with little or no effort to overcome retentive forces.

It should be understood that although particular embodiments of this invention have been described for the purposes of illustration, this invention includes all modifications and equivalents thereof, which fall within the scope of the appended claims.

I claim:

1. A holder for electrical components comprising:
   a resilient open frame having a strip-shaped base and two legs essentially of the width of the base and extending therefrom adapted to receive the component therebetween; and
   elongate clamp means adapted to fit the ends of said legs with the clamp means essentially parallel to said base and freely separable from each of the respective legs;
   the ends of the legs and the ends of the clamp means having interengaging parts with the distance of the interengaging parts of the clamp means being shorter than the distance of the interengaging parts of the legs in relaxed position, for drawing the ends of the legs inwardly to grip the component therebetween when the clamp means engages the legs.

2. A holder for electric components comprising:
   a resilient open frame having a base and upright legs one at each of two opposite ends of the base adapted to receive the component therebetween;
   on each of said legs a pair of laterally spaced lugs extending adjacent the top of the legs at essentially equal distances from said base; and
   an elongate clamp member having two apertures one adjacent to each of its ends, the outer rims of said apertures being spaced a distance shorter than the distance of said leg tops with the legs in relaxed position, and proportioned to fit tightly over said tops of the frame legs and to be engaged beneath said lugs, for drawing the ends of the legs inwardly to grip the component therebetween when the clamp member engages the legs.

3. A holder according to claim 2 wherein one of said legs has a recess adjacent said lugs, and said clamp member has a notch adjacent said leg recess, for inserting tool means in the recess and the notch to lever the frame leg lugs from engagement with the clamp member aperture rims.

4. A holder according to claim 2 wherein
   said frame leg lugs are provided by tabs struck out from the leg to form wedge means terminating in downwardly facing shoulders, such that when an aperture of the clamp member is levered over the leg, the leg is wedged inwardly to snap beneath the aperture rim of the clamp member for locking frame and clamp member together.

5. A battery holder comprising: a resilient frame having a base and an upright leg at each of two opposite ends of the base, one of said legs having extensions providing downwardly facing shoulder means at the top of each side of said leg, and the other leg having lugs on the outer face thereof; and a clamp member having two apertures, one of said apertures being axially sufficiently long to fit over said leg extensions and having a narrower transverse end portion with inner edges adapted to be engaged under said downwardly facing shoulders, the other aperture fitting over said other leg for engagement under said lugs on said other leg, for drawing and holding said legs inwardly when said edges of said clamp member apertures are engaged under said shoulders; whereby the clamp member can be passed axially over the leg and upon rotation inserted to engage the leg extensions and lugs respectively, and a battery disposed within the frame can be gripped between the legs.

6. A battery holder according to claim 5, wherein said clamp member has a central portion for gripping a battery between the clamp member and the frame base, and wherein said clamp member has downwardly extending side portions for preventing lateral movement of the battery within the frame.

7. A battery holder comprising: a resilient frame having a base and two upright legs one at each end of the base adapted to receive a cylindrical battery axially disposed between said legs, the first leg having top extensions providing downwardly facing shoulders one at each side of said leg, and the second leg having tabs struck out from the outer face thereof for providing wedge means terminating in downwardly facing shoulders and having a notch adjacent said tabs adapted to receive lever tool means; battery contact means carried by said second leg and insulated therefrom; and a clamp member having two apertures, one of which apertures extends longitudinally sufficiently wide to fit over said top extensions of the first frame leg and which has a narrower transverse portion the legs of which are adapted to be engaged under said top extension shoulders, the other aperture fitting tightly over said other frame leg to be engaged under said tab shoulders and being notched adjacent said tabs for receiving lever tool means, said clamp member being of arcuate shape adapted to conform to a battery, said clamp member apertures being dimensioned and spaced such that the clamp member can be engaged under said frame leg shoulders and wedged over said frame leg tabs by a lever tool means inserted in said frame leg recess for gripping said battery between said clamp member and said frame base and between said frame legs, and such that the lever tool means can be inserted in said clamp member notch for levering the frame leg adjacent the notch to permit removal of the clamp member from the frame.

8. A battery holder according to claim 7 wherein at least one of said legs includes battery contact means, and means for insulating said contact means from the respective leg.

9. A battery holder according to claim 8, wherein said battery contact means include terminal means extending from said frame, and wherein at least one of said battery contact means includes spring means adapted resiliently to engage the battery.

References Cited in the file of this patent
UNITED STATES PATENTS

| | | |
|---|---|---|
| 1,913,696 | Wiley et al. | June 13, 1933 |
| 2,951,107 | Abrams | Aug. 30, 1960 |